United States Patent
Ricard et al.

(10) Patent No.: US 10,936,979 B2
(45) Date of Patent: Mar. 2, 2021

(54) DYNAMIC EXTENSION OF SEMANTIC LAYER UNIVERSES

(71) Applicant: SAP SE, Walldorf (DE)

(72) Inventors: Christophe Ricard, L'Hay-les-Roses (FR); Naeem Asghar, London (GB); Frederic Millet, Chatou (FR)

(73) Assignee: SAP SE, Walldorf (DE)

( * ) Notice: Subject to any disclaimer, the term of this patent is extended or adjusted under 35 U.S.C. 154(b) by 1009 days.

(21) Appl. No.: 15/294,076

(22) Filed: Oct. 14, 2016

(65) Prior Publication Data

US 2018/0046960 A1 Feb. 15, 2018

Related U.S. Application Data

(60) Provisional application No. 62/374,280, filed on Aug. 12, 2016.

(51) Int. Cl.
*G06F 16/00* (2019.01)
*G06Q 10/06* (2012.01)
*G06F 16/28* (2019.01)

(52) U.S. Cl.
CPC ..... *G06Q 10/06313* (2013.01); *G06F 16/289* (2019.01); *G06Q 10/067* (2013.01)

(58) Field of Classification Search
CPC combination set(s) only.
See application file for complete search history.

(56) References Cited

U.S. PATENT DOCUMENTS

2010/0251129 A1* 9/2010 Beringer ............... G06F 9/451
715/738

OTHER PUBLICATIONS

Bocher, Erwan, et al. "GDMS: an abstraction layer to enhance Spatial Data Infrastructures usability." 2008.*
Konstantinou, Nikolaos, et al. "VisAVis: An Approach to an Intermediate Layer between Ontologies and Relational Database Contents." WISM 239 (2006).*
Bennani, Nadia, et al. "Multi-application profile updates propagation: a semantic layer to improve mapping between applications." Proceedings of the 21st International Conference on World Wide Web. 2012.*

* cited by examiner

*Primary Examiner* — Nan Hutton
(74) *Attorney, Agent, or Firm* — Buckley, Maschoff & Talwalkar LLC

(57) ABSTRACT

A system, method, and computer-readable medium, including authoring and consolidating a semantic layer universe and at least one semantic layer extension (e.g., a collection of semantic layer entities) created on top of the objects of the semantic layer universe, the semantic layer universe and the one or more semantic layer extensions being linked via a repository relationship; and dynamically presenting a consolidated view of relevant objects from the semantic layer universe and possibly entities of the at least one semantic layer extension to provide a user with additional querying metadata.

10 Claims, 6 Drawing Sheets

500

PUBLISH UNIVERSE TO EXPOSE ITS BUSINESS OBJECTS (BOs)
505

CREATE SET CONTAINERS
510

LINK THE UNIVERSE AND ONE OR MORE OF THE SET CONTAINERS TO EACH OTHER
515

CREATE SETS ON TOP OF THE UNIVERSE'S BO's
520

```
┌─────────────────────────────────────────────────┐
│ DETERMINE THE SET CONTAINERS LINKED TO THE      │
│ UNIVERSE TO BE QUERIED BASED ON THE REPOSITORY  │
│ RELATIONSHIPS OF THE UNIVERSE                   │
│                                            605  │
└─────────────────────────────────────────────────┘
```

```
┌─────────────────────────────────────────────────┐
│ RETAIN, IN ACCORDANCE WITH A SECURITY POLICY,   │
│ THE ALLOWED SET CONTAINERS                      │
│                                            610  │
└─────────────────────────────────────────────────┘
```

```
┌─────────────────────────────────────────────────┐
│ RETAIN, IN ACCORDANCE WITH THE SECURITY POLICY, │
│ THE ALLOWED BOs                                 │
│                                            615  │
└─────────────────────────────────────────────────┘
```

```
┌─────────────────────────────────────────────────┐
│ RETAIN, IN ACCORDANCE WITH THE SECURITY POLICY, │
│ THE ALLOWED SET(S)                              │
│                                            620  │
└─────────────────────────────────────────────────┘
```

```
┌─────────────────────────────────────────────────┐
│ PRESENT A CONSOLIDATED VIEW OF THE RELEVANT BOs │
│ AND ALLOWED SET(S) TO AN END USED VIA A UI      │
│                                            625  │
└─────────────────────────────────────────────────┘
```

FIG. 6

DYNAMIC EXTENSION OF SEMANTIC LAYER UNIVERSES

BACKGROUND

Enterprise software systems receive, generate, and store data related to many aspects of a business enterprise. This data may relate to sales, customer relationships, marketing, supplier relationships, inventory, human resources, and/or finances. Users may operate querying and reporting tools to access such data and display the data in useful formats, such as graphic visualizations and reports.

In some environments, a semantic layer universe may reside between an enterprise's data (e.g., a database) and the end users (e.g., customers). In some aspects, the semantic layer universe can include representations of the enterprise's data warehouse, including representations of real-world entities and processes. In some cases, the semantic layer universe might provide a mechanism to securely share the enterprise's data through a connection to one or more different querying clients. The semantic layer universe can be a valuable asset of the enterprise that can be used to generate insights into the operations of the enterprise. As such, constant maintenance of the integrity and security of the semantic layer universe may be vital to the enterprise. However, some users may have a desire to dynamically enhance capabilities of the semantic layer universe.

BRIEF DESCRIPTION OF THE DRAWINGS

FIG. 5 is an example embodiment of an illustrative flow diagram of an authoring process;

FIG. 6 is an example embodiment of an illustrative flow diagram of a querying process.

DETAILED DESCRIPTION

Figure 1:
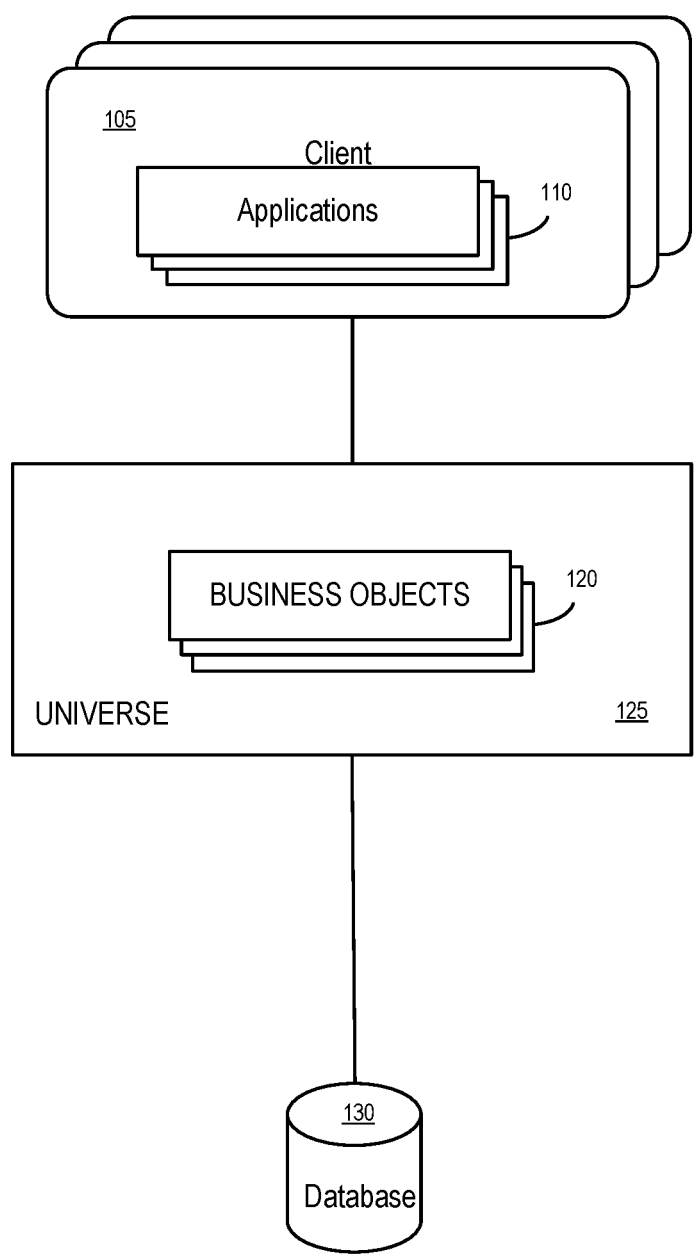
FIG. 1 is an illustrative schematic diagram of a system.

The following description is provided to enable any person in the art to make and use the described embodiments. Various modifications, however, will remain readily apparent to those in the art.

In some example contexts, use-cases, and embodiments, one or more terms will be used in the present disclosure. As a matter of introduction and to ease the understanding of the present disclosure, a number of terms will be introduced, where the full meaning of the following terms will be further understood in context of the disclosure herein, on the whole.

As used herein, a "Business Object" (BO) or simply "object" represents an aspect or feature of a real-world entity (e.g., company, person, product, process, a key performance index (KPI) for an area of an organization or business, etc.) and is mapped to specific data structures (e.g., table columns) in an underlying data source such as a database. A BO is a semantic entity, such as "Year", "Region", "Product", "Customer", etc. that represents a logical way of categorizing and grouping data for meaningful analysis of a business area or activity. A BO data structure can include fields with attributes and metadata associated with and defining the attribute fields. In some aspects, the BO refers to the specific collection of data according to the data structure (i.e., an instance of the BO data structure) that is stored in the database.

A "repository" may refer to a database used to store enterprise (i.e., organizational) platform information, such as user, server, folder, document, configuration, and authentication details.

A Semantic Layer (SL) herein refers to a representation of an organization's data that facilitates end users accessing the data autonomously using common understandable terms. A semantic layer may map complex data to familiar terms such as, for example, "product", "customer", or "revenue" in an effort to offer a unified, consolidated view of data across the organization that users can access without having a need to know the intricacies and complexities of the database, including its schema. The data and metadata (that is, objects) that comprise the semantic layer may be retrieved from a database and form a "semantic layer universe". As used herein, a semantic layer universe (also referred to simply as a "universe" and "UNX") is an abstraction of a data source that maps complex data into descriptive terms used across the organization. Some examples include, "Product," "Customer," "Region," "Revenue," "Margin", and "Costs". The universe resides between an organization's database(s) (or other data sources) and end-users such as customers, and isolates the end users from the technical details of the database(s) where source data is stored. Consistent with other terms herein, semantic universes include objects that are grouped into classes (and subclasses) that are mapped to the source data in the database and may be accessed through queries and reports. A "universe editor" refers to a dedicated User Interface (UI) that provides a mechanism to allow a specific role among users (universe designers) to design universes.

As used herein, a "set" refers to a semantic entity defining one or more steps to follow (i.e., a method) to produce, for example, a list of unique and homogeneous data-mart identifiers (Customer IDs, Product IDs, Transaction IDs, etc.). A set is created on top of BOs, including the data (e.g., fields and attributes) and metadata associated therewith. A set may include other aspects or features, in addition to the one or more BOs on which it is created or based. A "set container" refers to a structure hosting a number of sets, possibly among other entities, for performance and administrative purposes. A "set designer" refers to a role aimed at designing and publishing sets and a "sets editor" refers to a dedicated UI that allows set designers to design Sets.

In some aspects herein, the term "secured universe" is used. A secured universe refers to a transient version of a universe that might be generated for end users' purposes. The secured universe restricts what a given user can see and manipulate according to the credentials the user provides when logging into a system.

A "query" is used to retrieve a collection of BOs (i.e., "objects") based on specific criteria. In some embodiments, an inquiry or query is converted by an application, service, or server (e.g. a BusinessObjects server) to SQL or other language statements appropriate to query the database. The SQL (or other language) query is sent to the database to retrieve the data mapped to the objects referenced and relevant to the query. A collection of criteria that restricts the type and/or number of records returned as a query result is referred to as a "filter". In some aspects, a filter defines a sub-set of data to appear in a query's result list. Some embodiments herein may include a "query panel" (QP). A QP refers to a UI, possibly dedicated, that provides a mechanism to allow end users to define queries. The QP may also present a view of the Universe to the end user.

FIG. 1 is an illustrative block diagram of an architecture or system 100, in one example. Examples of some embodiments of the present disclosure are not limited to the particular architecture 100 shown in FIG. 1. System 100 includes one or more client devices 105 running one or more applications 110. Applications 110 may, in some embodiments, include a suite of different software applications having, at least to some extent, related functionality, similar user interfaces, and some ability to exchange data with each other. Applications 110 may include different software applications that support the operations and process of an organization.

System 100 includes a semantic layer universe 125 comprising a plurality of business objects (BOs) 120. Universe 125 is logically located between an enterprise's or organization's source of data stored on data store 130 (e.g., an in-memory database) and a consumption level including clients 105 where users can create queries via, for example, user interfaces, UIs, (not shown in FIG. 1) of the applications 110 executing, at least in part, on the clients.

Universe 125 is an abstraction of data source 130 that maps complex data into descriptive terms used across the organization. Some example terms include "Revenue", "Margin", and "Costs". Universe 125 is separate and distinct from the data source 130. Universe 125 includes objects (e.g., "Product", "Customer", and "Region") that are grouped into classes and mapped to the data in the database 130. The data in database 130 may be accessed using, for example, plain language names, through queries from applications 110. Universe 125 may be created or authored by a "universe editor" (not shown). The universe editor may include a UI that provides a mechanism for a user to design universes using, for example, drag-and-drop techniques to interact with graphical representations thereon.

In some aspects, a universe administrator or other authorized entity in defining a universe may consider and attempt to anticipate what data features, access, and relationships end users/consumers may want and need. After defining the objects and constraints of a universe, the universe administrator may author and publish the universe so the end users can see, access, and use it to interact with the database supporting the universe.

In some aspects, universe 125 may be used by the different applications 110, where applications 110 may correspond to different applications or services offered by a software provider. As such, the data representations of universe 125 may be a valuable asset and aspect to the on-going functionality of an associated organization, including objects representing operational and analytical processes of the organization.

In some aspects, it can be vital that the integrity and accuracy of universe 125 be securely maintained. In some embodiments, universe 125 may be read-only by users, thereby preventing users from changing data that might be critical or relevant to an enterprise and parts thereof. Universe 125 may however be modified by an entity having a sufficient security clearance to making changes thereto such as a universe editor (not shown). In some embodiments or contexts, a universe may be periodically updated or otherwise modified to reflect changes to the organization and/or its processes and methods of operation. However, a universe might be modified occasionally, about, in some instances, once every three to six months.

In one example, a client 105 executes an application 110 to present a query panel (QP) via a user interface (UI) to a user on a display of client 105. The user manipulates UI elements within the UI to indicate a query by selecting one or more graphical representations of BOs, where a server or service embodying universe 125 operates to generate one or more SQL statements that are sent to database 130. Database 130 may execute instructions corresponding to the SQL statements to generate query results (i.e., data mapped to the objects selected by the user). The query results may be presented to the user in a view including, for example, a report, a dashboard, or other record.

Data store 130 may comprise any data source or sources that are or become known. Data store 130 may comprise a relational database, a HTML document, an eXtendable Markup Language (XML) document, or any other data storage system storing structured and/or unstructured data files. The data of data store 130 may be distributed among several data sources. Embodiments are not limited to any number or types of data sources.

Data store 130 may implement an "in-memory" database, where a full database is stored in volatile (e.g., non-disk-based) memory (e.g., Random Access Memory). The full database may be persisted in and/or backed up to fixed disks (not shown). Embodiments herein are not limited to an in-memory implementation. For example, data may be stored in Random Access Memory (e.g., cache memory for storing recently-used data) and other forms of solid state memory and/or one or more fixed disks (e.g., persistent memory for storing their respective portions of the full database).

Figure 2:
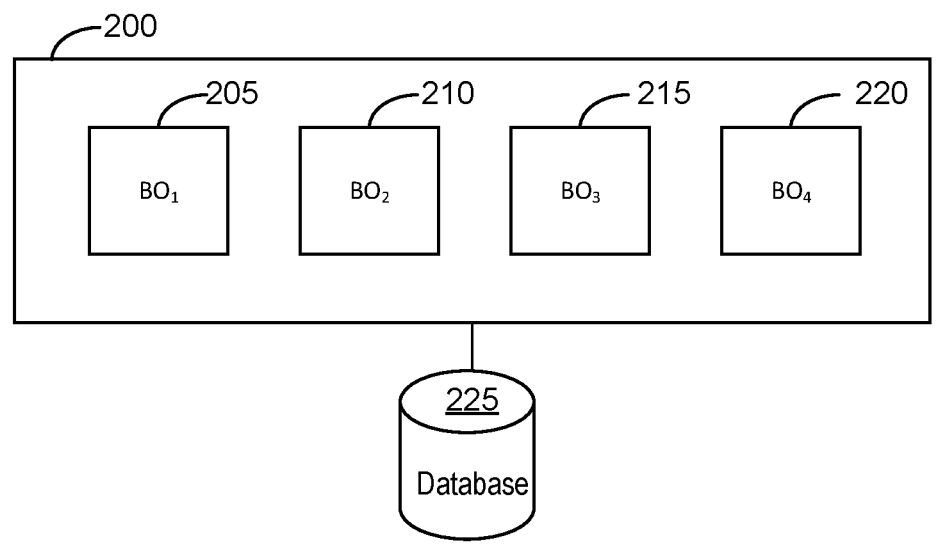
FIG. 2 is an example schematic embodiment of a semantic layer universe.

FIG. 2 is an illustrative depiction of a semantic layer universe 200. Universe 200 may be created (i.e., authored) by a universe designer or other authorized entity via a universe editor UI tool, feature, application, or service. Universe 200 includes, by way of example, BOs 205, 210, 215, and 220. Each of the BOs in universe 200 are representations of model-based data structures having fields and attributes, where each BO is defined by metadata associated therewith. Universe 200 is a metadata semantic layer and does not itself contain data. The data corresponding to the BO representations in the semantic layer universe 200 is stored in a database (e.g., FIG. 1, 130) or other data store. Reference numeral 225 refers to a database, database management system, an instance of a database node, or other data source storing the data mapped to BOs 205, 210, 215, and 220. FIG. 2 is a simplified example of a universe and specific implementations of a universe may include thousands of BOs representing different aspects of an enterprise.

In some contexts, a user or other entity may want to enrich an existing or new universe (e.g., 125) to include innovations such as, for example, additional or different methods and data representations and relationships not offered by an organizations' semantic layer universe. In some example embodiments, the innovations may occur rather frequently as compared to the lifecycle of the universe and may further relate to a specific subset of applications 110 and/or users thereof. In some aspects, a "set" may be created by a user (e.g., a set designer working to implement desires of end users) to define a method to produce, for example, a list of unique and homogeneous data-mart identifiers (Customer IDs, Product IDs, Transaction IDs, etc.). The set is created on top of the BOs of universe 125, where the set is also a semantic entity and includes at least some aspects (e.g., fields, attributes, methods, and metadata) of the objects of the universe. A set herein may include other aspects or features, in addition to the one or more BOs (or parts thereof) on which it is created or based. In some aspects, the set may be updated or created on a daily or even shorter timeframe.

Figure 3:
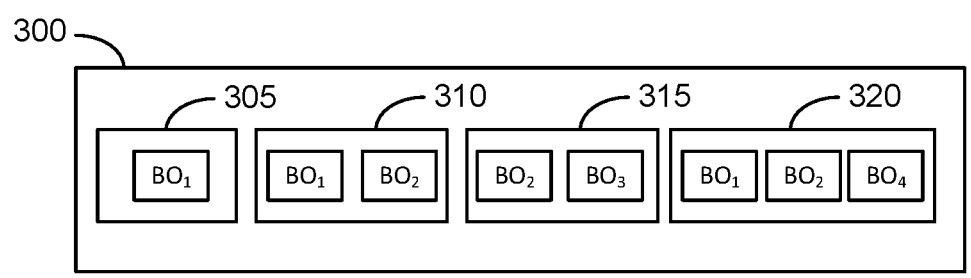
FIG. 3 is an example schematic embodiment of a semantic layer set.

FIG. 3 is an illustrative example of semantic layer sets or simply "sets". In the example of FIG. 3, the depicted sets include set 305, set 310, set 315 and set 320. Each set is defined and created on top of one of more objects (i.e., BOs) from the universe that it is associated with. The sets of FIG. 3 are associated with universe 200 of FIG. 2. As such, each set in FIG. 3 is created on top of or is based on one or more of the BOs of universe 200. As depicted in FIG. 3, set 305 is created on top of BO1 from universe 200; set 310 is created on top of BO1 and BO2 from universe 200; set 315 is created on top of BO2 and BO3 from universe 200; and set 320 is created on top of BO1, BO2, and BO4. As used herein, a set that is created on top of a BO means that the set includes at least some of the characteristics (e.g., fields, methods, and attributes) of the underlying BO, as well as the associated metadata of the BO. In some embodiments, the underlying BO may be unaltered, whereas the underlying BO may be altered in some embodiments (e.g., some attributes not used or changed). The sets in FIG. 3 are further shown as being grouped together by a set container 300. The example of FIG. 3 illustrates one set container including four sets. A universe may have multiple set containers linked or associated therewith, as defined by a repository relationship.

Figure 4:
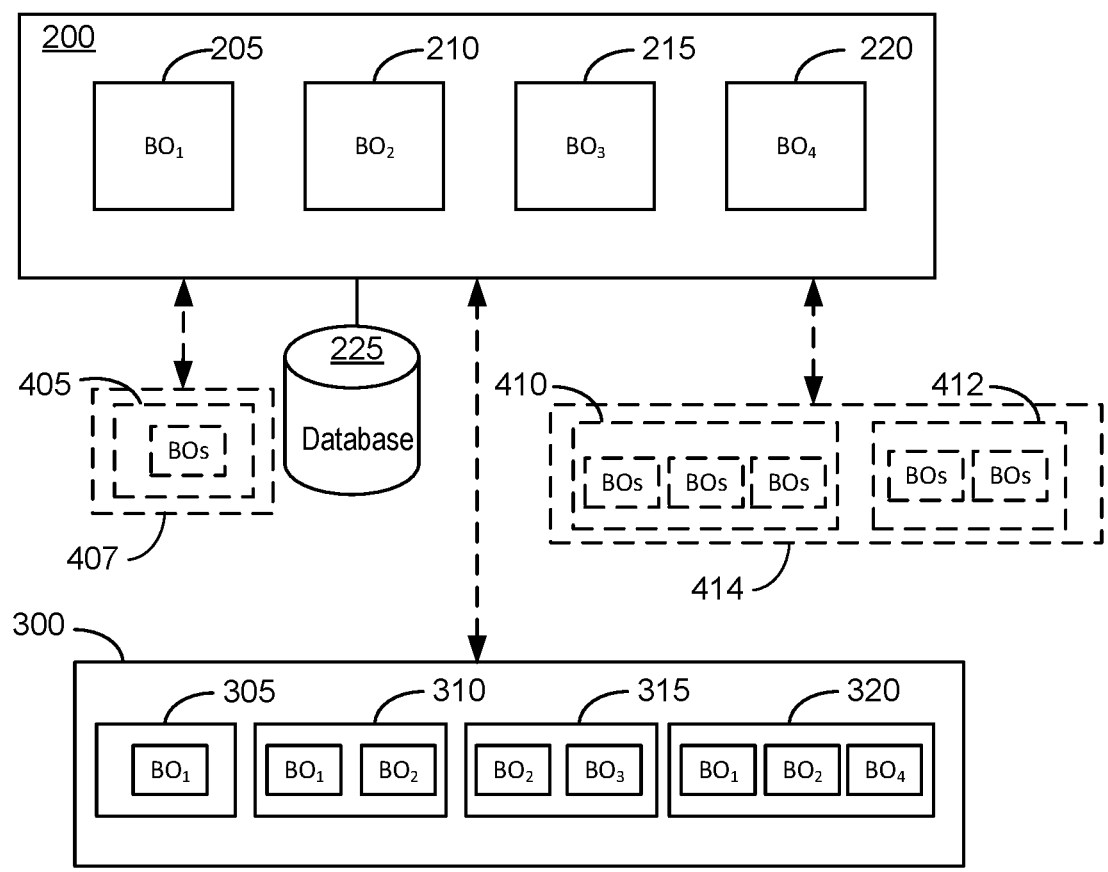
FIG. 4 is an example schematic embodiment of a consolidated semantic layer universe.

FIG. 4 is an illustrative depiction of a semantic layer universe 200 and the set container 300 being linked together by a repository relationship, as depicted by the dashed line arrow between the universe and set container 300 including sets 305, 310, 315, and 320. The repository relationship defines the connection or association between universe 200 and the sets 305, 310, 315, and 320 included in set container 300. FIG. 4 further illustrates that universe 200 may be linked to one or more set containers, each including one or more sets that in turn are created on top of one or more objects of the universe. As illustrated in FIG. 4, semantic layer universe 200 is further linked to set containers 407 and 414, where set container 414 includes sets 410 and 412 and set 405 is included in set container 407. In the example of FIG. 4, set containers 407 and 414 and the contents therein are depicted as dashed lines to further indicate that these set containers are newly created extensions of semantic layer universe 200.

In some aspects, including but not limited to security concerns and an incompatibility in lifecycles, a universe and one or more sets relating thereto might not be merged. For example, enhancements and features that might be desired by some users and not included in a semantic layer universe might not be added to the universe at an authoring level of the universe where the universe is created and published. However, in accordance with some example embodiments herein, features enabled by one or more (new) semantic layer sets may be consolidated with a universe to add, from a user's perspective, the technical features and enhancements of the one or more sets to the universe at a consumption level where the user creates a query of a database via the universe, in a novel manner.

FIG. 5 is an illustrative flow diagram of an example process 500 for authoring extensions to a semantic layer universe. At operation 505, a universe is published to expose its objects (as defined herein) to another entity, application, service, or system. The semantic layer universe of operation 505 may include one or more of the characteristics disclosed herein and the objects of the universe may be associated with a data source such as a database (e.g., an in-memory database).

Operation 510 includes creating set containers that may be linked to the semantic layer universe published in operation 505. In some instances, a set designer may create one or more set containers at operation 510, where the set containers are semantic layer entities that are separate and distinct from the semantic layer universe 200. Operation 510 is directed to the creation of the one or more set containers. As such, the set containers do not yet include any sets. As a repository resource itself, a set container may have a level of security applied to it.

Proceeding to operation 515, the semantic layer universe published at operation 505 may be linked to or otherwise associated with one or more of the set containers created at operation 510. In some embodiments, the universe and the set containers may be linked to each other via repository relationships defining a dependency therebetween. The repository relationships may be expressed in metadata that may be stored in a location separate and distinct from the universe.

At operation 520, sets are created on top of the universe's BOs. The sets are also a semantic layer entity and may represent collections of data (e.g., methods, entities, etc.) that differ from the BOs of the universe from which the sets' BOs are derived. In some embodiments, sets may be designed by a set designer using a dedicated sets editor that is a design tool strictly for defining sets. In some embodiments, only BOs available to the set designer in accordance with their role and security privileges can be created by a given set designer. The sets generated at operation 520 may be grouped into the one or more set containers linked to the universe at operation 515. The sets can be published for viewing and usage as being grouped into set containers. The set(s) are a semantic entity and are not stored in the universe, rather the sets are stored elsewhere.

Process 500 may, in some embodiments, include all of the operations shown in FIG. 5, include fewer than all of the operations of FIG. 5, and comprise a portion of another process.

FIG. 6 is an illustrative flow diagram of an example process 600 for querying a semantic layer universe and extensions thereof (i.e., semantic layer sets linked to the given universe). At operation 605, a determination is executed to ascertain the set containers, if any, linked to the given universe. Operation 605 and process 600 may be invoked or triggered in response to a query of the given universe. The query may be initiated by an end user interacting with a system (e.g., system 100) via a UI query panel (QP). In some embodiments, some aspects and characteristics of the universe, such as repository relationships of the universe to be queried, can be examined to determine all of the set containers linked to the universe.

At operation 610, the set containers available to the querying entity based on that entity's role and corresponding security access levels or privileges are retained. Set containers not available due to security constraints may be discarded from further consideration with respect to the current query. Operation 615 further includes retaining the BOs in the set containers retained at operation that are allowed based on the querying entity's role and corresponding security access levels or privileges. The BOs not available due to security constraints may be discarded from further consideration with respect to the current query. At operation 620, the allowed set(s) available to the querying entity based on that entity's role and corresponding security access levels or privileges are retained. At operation 620, the allowed sets will include the allowed BOs as determined at operation 615. The allowed set(s) will be retained and the other, non-allowed set(s) can be discarded from further consideration with respect to the current query.

At operation 625, a consolidated view of the relevant BOs and allowed set(s) may be presented to the end user that invoked the query. In some instances, the consolidated view is presented in a UI of the tool, application, or service that provided a point of interaction for the end user to initiate the query.

According to process 600, appropriate set containers of a given universe are collected at the semantic layer level based, at least in part, on the repository relationships of the given universe at the time the query is initiated and presented to the system. Further, the relevant sets are consolidated with the relevant BOs of the given universe for consumption of the end user. This consolidated universe including the semantic layer aspects of the relevant set(s) is transient and is referred to herein as a secured universe. The secured universe, as illustrated by the operations of FIG. 6, can restrict the view presented to the end user to include reflect the security privileges of the user.

Process 600 may, in some embodiments, include all of the operations shown in FIG. 6, include fewer than all of the operations of FIG. 6, and comprise a portion of another process.

In some aspects, an end user may be presented with a view of the consolidated universe that is extended to include the security-cleared sets. In some embodiments, an end user may see the features, methods and other data representations (e.g., a new BO created in a newly created set). However, whether the features or methods are part of the universe created during a universe creation phase or part of a universe consolidation generated dynamically at the time of a query execution may not be revealed or otherwise indicated to the end user.

In some embodiments, the consolidated, secure universe is generated dynamically when needed (i.e., in response to a query). The consolidated or merged universe including the original universe and the relevant set(s) may be stored separate and apart from original universe. The merged universe may be implemented as an in-memory copy, decoupled from the original universe. In some aspects, the sets may be viewed as "filters".

Figure 7:
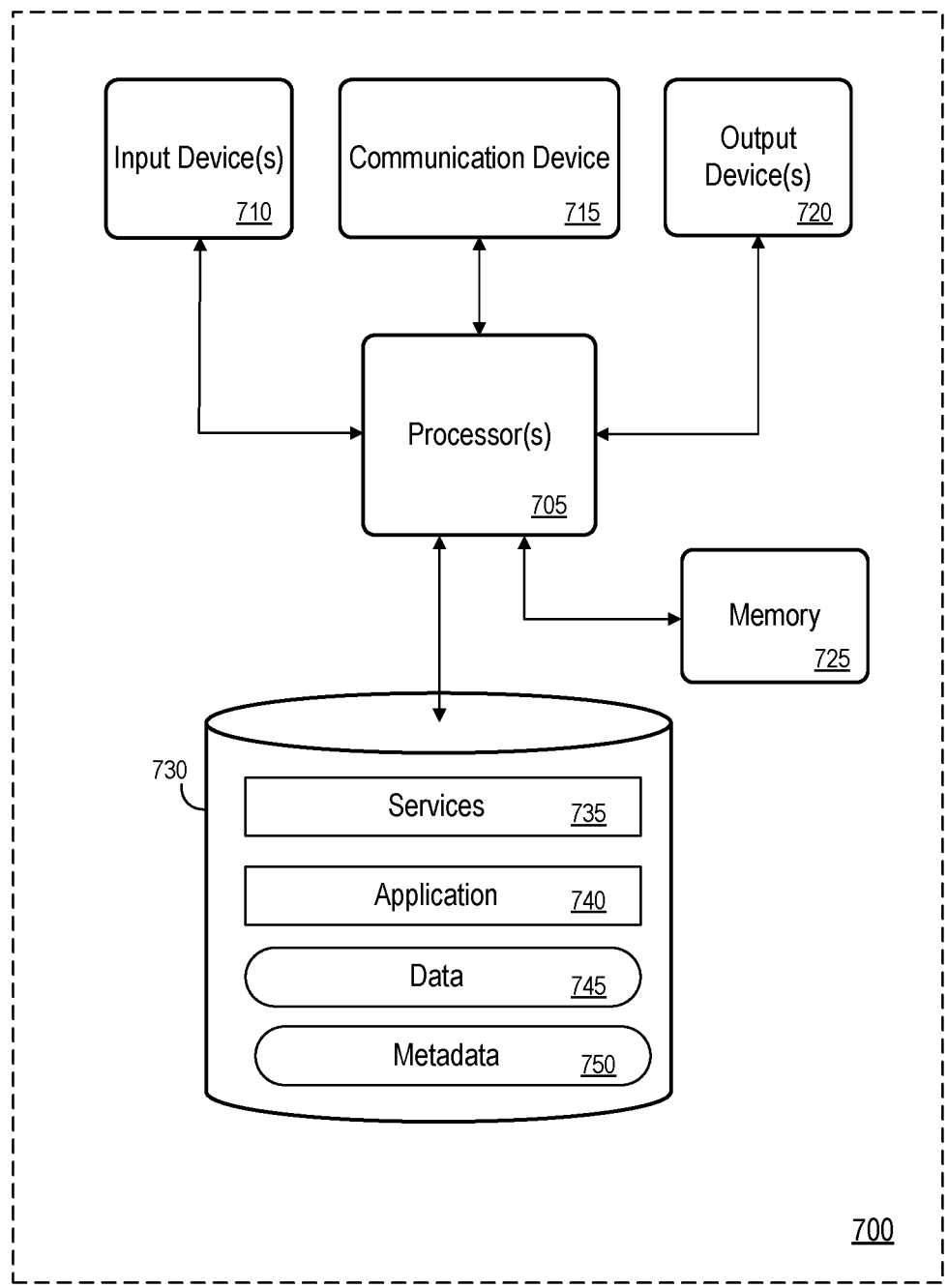
FIG. 7 is a block diagram of an apparatus, according to some embodiments.

FIG. 7 is a block diagram of apparatus 700 according to some embodiments. Apparatus 700 may comprise a computing apparatus and may execute program code to perform any of the functions described herein. Apparatus 700 may comprise an implementation of server supporting an application (e.g., 110), a semantic layer 125, and a data store of FIG. 1 in some embodiments. Apparatus 700 may include other unshown elements according to some embodiments.

Apparatus 700 includes processor 705 operatively coupled to communication device 720, data storage device 730, one or more input devices 710, one or more output devices 720 and memory 725. Communication device 715 may facilitate communication with external devices, such as a reporting client, or a data storage device. Input device(s) 710 may comprise, for example, a keyboard, a keypad, a mouse or other pointing device, a microphone, knob or a switch, an infra-red (IR) port, a docking station, and/or a touch screen. Input device(s) 710 may be used, for example, to enter information into apparatus 700. Output device(s) 720 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 725 may comprise Random Access Memory (RAM), Storage Class Memory (SCM) or any other fast-access memory.

Services 735 and application 740 may comprise program code executed by processor 705 to cause apparatus 700 to perform any one or more of the processes described herein. Embodiments are not limited to execution of these processes by a single apparatus.

Data 745 and metadata 750 (either cached or a full database) may be stored in volatile memory such as memory 725. Metadata 750 may include information regarding fields, attributes, and methods of objects comprising a semantic layer. Data storage device 730 may also store data and other program code and instructions for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system to author extensions to a semantic layer universe, the system comprising:
   a memory storing processor-executable instructions; and
   a processor to execute the processor-executable instructions to cause the system to, during a design time:
      publish a semantic layer universe to expose objects of the universe, each of the objects being a semantic layer entity representative of a data structure having fields and attributes defined by metadata;
      create one or more set containers, the one or more one set containers each being a semantic layer entity that is separate and distinct from the semantic layer universe;
      link the semantic layer universe to at least one of the one or more set containers via a repository relationship;
      create one or more sets on top of the semantic layer universe's objects, the one or more sets being grouped into the at least one of the one or more set containers linked to the semantic layer universe;

receive a request to query the semantic layer universe including the one or more set containers;

determine, based on an examination of the repository relationships for the semantic layer universe, set containers linked to the semantic layer universe;

retain, in accordance with a security access policy, set containers available to the query;

retain, in accordance with the security access policy, objects available in the retained set containers;

retain, in accordance with the security access policy, available sets including the retained objects; and present a consolidated result of the query based on the available set containers, objects, and sets in response to the request.

2. The system of claim 1, wherein each of the one or more sets includes at least some of the fields, attributes, and metadata of the objects on which it is based.

3. The system of claim 1, wherein the repository relationship defines an association between the semantic layer universe and the at least one of the one or more linked set containers including the one or more sets.

4. The system of claim 1, wherein a set defines a method to produce a data-mart identifier.

5. The system of claim 1, wherein the one or more sets are stored in a location separate and distinct from the semantic layer universe.

6. A computer-implemented method for authoring extensions to a semantic layer universe, the method comprising:

publishing a semantic layer universe to expose objects of the universe, each of the objects being a semantic layer entity representative of a data structure having fields and attributes defined by metadata;

creating, during a design time, one or more set containers, the one or more set containers each being a semantic layer entity;

linking, during the design time, the semantic layer universe to at least one of the one or more set containers via a repository relationship;

creating, during the design time, one or more sets on top of the semantic layer universe's objects, the one or more sets being grouped into the at least one of the one or more set containers linked to the semantic layer universe;

receiving a request to query the semantic layer universe including the one or more set containers;

determining, based on an examination of the repository relationships for the semantic layer universe, set containers linked to the semantic layer universe;

retaining, in accordance with a security access policy, set containers available to the query;

retaining, in accordance with the security access policy, objects available in the retained set containers;

retaining, in accordance with the security access policy, available sets including the retained objects; and presenting a consolidated result of the query based on the available set containers, objects, and sets in response to the request.

7. The method of claim 6, wherein each of the one or more sets includes at least some of the fields, attributes, and metadata of the objects on which is based.

8. The method of claim 6, wherein the repository relationship defines an association between the semantic layer universe and the at least one of the one or more linked set containers including the one or more sets.

9. The method of claim 6, wherein a set defines a method to produce a data-mart identifier.

10. The method of claim 6, wherein the at least one set is stored in a location separate and distinct from the semantic layer universe.

* * * * *